Figure 1:
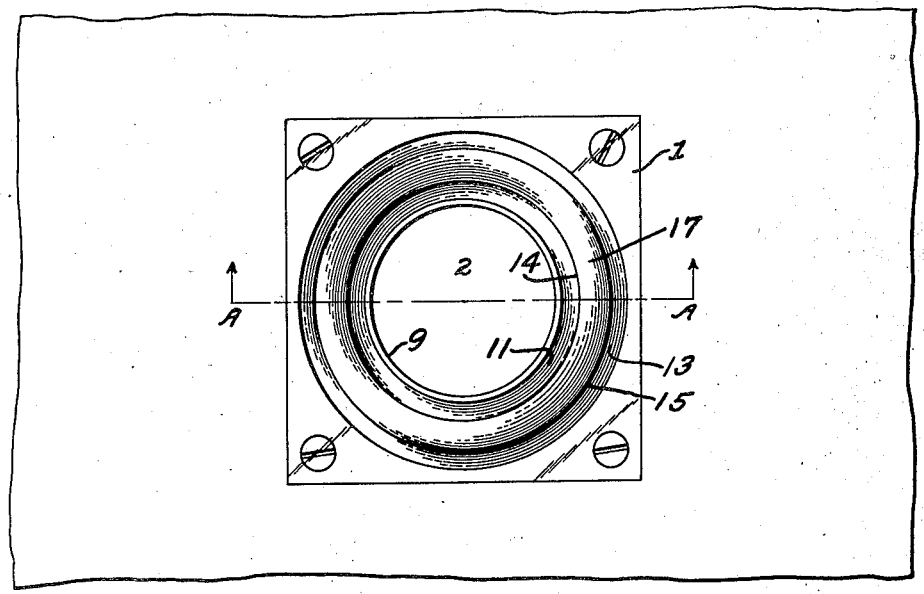
Figure 2:
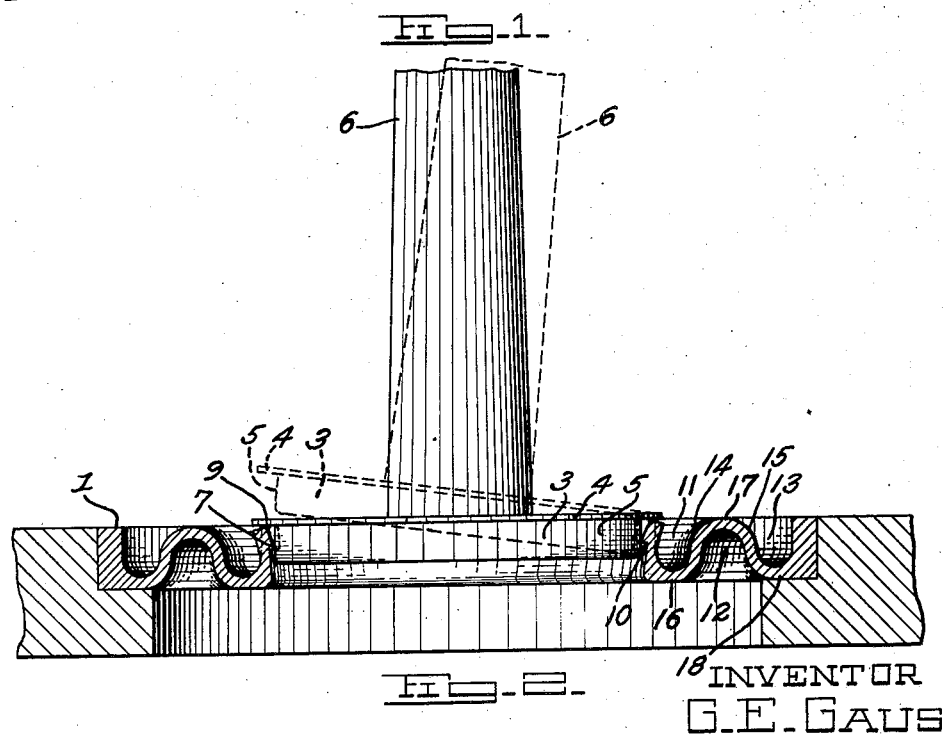

April 2, 1935.  G. E. GAUS  1,996,329

STAFF HOLDER

Filed Oct. 4, 1934

INVENTOR
G. E. GAUS

BY  ATTORNEY

UNITED STATES PATENT OFFICE 1,996,329

STAFF HOLDER

George E. Gaus, Washington, D. C.; dedicated to the free use of the public

Application October 4, 1934, Serial No. 746,841

2 Claims. (Cl. 248—38)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to that class of holders employing a socket having yielding walls and gripping means, and has for its primary object to provide a staff retaining device of simple and inexpensive construction, permitting the engagement, retention and release of the staff without auxiliary mechanical manipulation.

A further object of my invention is to provide a reasonably secure retention for the staff when subjected to lateral draft, yet which will permit the staff to be forcibly rocked out of engagement.

In order to carry out the purposes of my invention, reference is to be had to the peculiar combination and arrangement of parts as shown in the accompanying drawing, forming a part of this specification, in which similar numerals refer to similar parts throughout the several views.

Figure I is a plan view of my staff holder, and

Figure II is an enlarged cross-section taken on line A—A, illustrating the method of engagement of the staff with my staff holder, the staff being shown in fragmentary elevation for convenience in illustration.

Referring to the drawing, plate 1, formed of a blank of spring tempered metal, is provided with a socket 2 adapted to engage a staff 6.

The staff 6 is provided with an unyielding base 3, flange 4, and a depending perpendicular flange 5, formed thereon.

The socket 2 of plate 1 is provided with outwardly tapered wall 9, dimensioned to readily receive staff base 3. A gripping lip 7, dimensioned for a force fit with said staff base 3, is formed integral on tapered wall 9 by an undercut 10.

Annular channels 11, 12, 13, corrugated concentrically with socket 2, are provided with resilient bridges 16, 17, and 18, integral with resilient walls 14, 15.

My invention may be practiced by mounting plate 1 by any suitable means, not shown, which will permit the springing of corrugated annular channels 11, 12, 13, during the engagement and release of staff base 3. When plate 1 is thus mounted, engagement of staff 6 with plate 1 is effected by inserting staff base 3 within the confines of tapered wall 9 of socket 2, thence applying downward pressure on staff 6 causing depending flange 5 of staff base 3 to bear forcibly against gripping lip 7. The diameter of staff base 3 is greater than the diameter of socket 2 at its juncture with undercut 10, which forms gripping lip 7. Downward vertical pressure on staff 6 causes a slight inward deflection of tapered wall 9 with concurrent yielding of resilient members 14, 15, 16, 17, and 18, thus permitting continued downward movement of staff base 3 within socket 2. Downward movement of staff 6 is ultimately arrested by contact of flange 4 with the upper surface of socket 2.

It is apparent, related parts of staff 6 and plate 1 are so dimensioned that the relatively small line area presented by gripping lip 7 when placed in forcible contact with flange 5 results in a bite-like and secure retention of staff base 3, not readily obtainable in a broad surface friction contact between concentric parts without application of considerable pressure upon the meeting parts.

Release of staff base 3 from contact with gripping lip 7 may be effected by forcibly applying lateral draft, from various angles, to staff 6, thereby causing unequal flexing action of the resilient members of annular channels 11, 12, 13, with consequent deformation of the concentric line of contact between gripping lip 7 and staff base 3.

It is obvious that minor changes may be made in the details of construction and the arrangement of the parts without departing from the spirit of the invention as set forth in the appended claims.

Having thus described my invention, what I claim for Letters Patent is:

1. A staff holder comprising a plate having a socket member formed therein including a centering portion having an outwardly tapered inner wall contiguous with an arris formed in its lower portion, and a substantially unyielding staff base therefor including an annular flange, a depressed central portion, and a cylindrical side wall, said outwardly tapered inner wall and said arris adapted to receive and to engage the side wall of the staff base, and a plurality of substantially resilient corrugated annuli formed on said plate concentric with the socket member.

2. The combination of a plate, having a socket member, with a staff, a base formed on said staff, said base provided at its top with a flange, said socket member having an undercut formed thereon and an arris integral therewith adapted to forcibly contact said base, and said plate having resilient corrugated annuli formed thereon concentric with said socket member.

GEORGE E. GAUS.